July 13, 1948.  E. M. GUYER  2,445,063

ELECTRIC GLASS HEATING

Filed Dec. 10, 1940

Inventor
EDWIN M. GUYER
By F. H. Knight
Attorney

Patented July 13, 1948

2,445,063

UNITED STATES PATENT OFFICE 2,445,063

ELECTRIC GLASS HEATING

Edwin M. Guyer, Corning, N. Y.

Application December 10, 1940, Serial No. 369,481

6 Claims. (Cl. 219—19)

This invention relates to the heating of glass bodies in the hard state and more particularly to means and methods by which glass bodies may be highly heated in localized regions by the use of electricity.

In applicant's copending application Serial No. 191,531, filed February 19, 1938, now Patent No. 2,306,054, issued December 22, 1942, of which this application is a continuation in part, the pyroelectrolytic character of glass is discussed and means and method are disclosed for working glass bodies in the hard state by electric conduction heating which includes heating a section of glass to a temperature at which it will conduct electricity and thereafter flowing a current of electricity therethru along a predetermined path. In the foregoing application the advantages of high frequency electrical currents for electric glass heating are extensively discussed as well as various means for providing such currents and for their manipulation and control.

The present invention has for its object economical sources of electric energy adapted for electric glass heating and suitable methods of control so that such means may be adapted to the needs and technique of electric glass heating.

A further object of the present invention is a method and means for controlling electric discharges in connection with electric glass heating to obtain prompt and accurately controlled strike-in of the discharge into the glass and development of the desired heated stripes and area in the glass body being heated.

This invention includes among its features circuits and mechanism for the combined production of electric discharges of different potential and frequency at glass heating electrodes and the proper positioning and manipulation of said electrodes to control the position and action of said discharges during different stages of electric glass working.

Additional objects and features will be apparent on study of the following specification in which.

Figure 1:
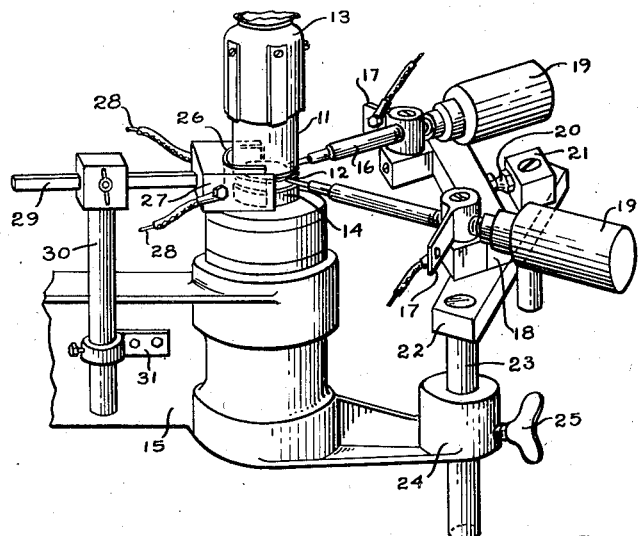
Fig. 1 is a perspective view of a portion of a sealing machine with associated electrodes adapted for electric glass heating.

Electric glass heating may be adapted to many different types of glass working operations in which glass bodies are sealed together or excess glass is removed. Such processes are most easily performed on hollow bodies of revolution and the basic apparatus necessary for such manipulations includes a chuck or chucks suitable for holding and rotating the glass parts in properly spaced relation and means for producing, applying, and controlling the discharge of electric currents to and thru the desired portions of the glass bodies. A device adapted for the sealing of a glass bulb 11 to a pressed glass base 12 is shown in Fig. 1. These glass parts are held respectively by chucks 13 and 14 and are rotated at identical speeds by interconnected gear trains or other conventional mechanism which is not shown. The entire assembly is mounted on a frame 15, only a portion of which is shown in Fig. 1.

A heater and the electrodes by which the sealing of the glass parts is accomplished are mounted on brackets formed as a part of the frame 15. The electrode assembly consists of a pair of electrode rods 16, screw threaded into terminals 17 which are pivotally mounted on the ends of an insulating support 18. Insulating handles 19 are provided for manipulation of the individual electrodes as well as the assembly as a whole. The entire assembly is adjustable about a horizontal pin 20 extending from fixture 21 which is pivoted in the end of an insulating arm 22. This arm is mounted on pin 23 which is held in vertical adjustment in boss 24 by set screw 25. The space heater shown in conjunction with these electrodes consists of a resistance band 26 mounted on a block of insulation 27 and is provided with suitable terminals 28 for connection with an electrical power supply. The vertically adjustable rods 29 and 30 and bracket 31 permit proper spacing of the heater with respect to various types of work.

In the operation of the above described device as a sealing machine, glass parts of the desired configuration are placed in axial alignment in the chucks 13 and 14 and rotated simultaneously while chuck 13 is lowered by suitable means (not shown) until their edges are close together. In this position the edge portions are subjected to the gentle heating action of the radiant space heater 26 or any alternative diffuse sources of heat insufficient to soften the glass but sufficient to form a gradual temperature gradient in the glass which prevents its fracture when the sealing heat is applied along the adjacent edges. After suitable preliminary heating from this source, intense heat is generated locally in the edge of at least one of the glass parts by passing an electric current therethru. As the glass melts the edges are brought into contact and sealed together, the heating current being maintained during the sealing operation. The amplitude of this heating current is controlled by the position of the electrodes and by the characteristics of the circuits by which this current is supplied as will be more fully explained. If it is desired to burn off a moil, the lower chuck 14 may be eliminated.

Figure 2:
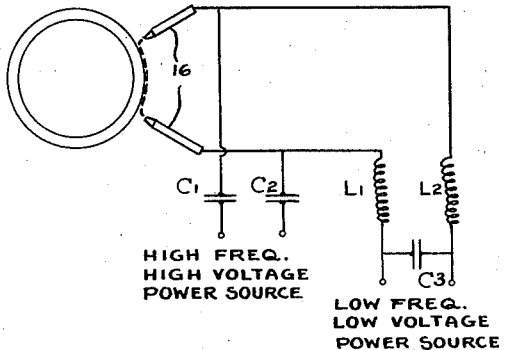
Fig. 2 is a diagram showing one form of two frequency power supply connected to the glass heating electrodes.

In Fig. 2 is illustrated a circuit which has been found desirable as a source of power for the heating electrodes 16. In this circuit a high voltage, high frequency potential of the order of magnitude of 10 k. v. and 1 megacycle is impressed on the electrodes thru condensers $C_1$, $C_2$ which are of approximately 2,000 m. m. f. capacity. The setting of electrodes 16 is such that when this high voltage, high frequency potential is impressed thereon the air gap between them is broken down and a spark forms along the edges of the rotating glass parts. If the glass is not already hot enough, a very few seconds application of this spark heats the rim of one or both of the glass parts to a temperature at which it is conducting and the spark breaks directly to the surface of the glass in alignment with the electrodes. Often when working on glass still hot from previous forming operations or on glass which has been heated to an appreciable degree by the radiant band 26 or similar heater, the impressed potential may be considerably less than that required to break down the gap between electrodes, the discharge striking directly into the warm glass between the electrodes.

While high frequency potentials are extremely useful in forming the spark between the electrodes and the glass and for heating the glass during early stages of the process while its electrical resistance is high, such potentials are difficult to create with equipment having high power capacity, and if such equipment is supplied it is most inefficient in operation. When the discharge first strikes into the glass the resistance is usually very high, often of the order of 10,000 ohms and the current which flows is measured in fractions of an ampere. As the glass is heated by the passage of this current its resistance drops rapidly so that at the final temperature desired for sealing or burn-off its resistance may be no more than one ohm. Such a wide range of load impedances cannot be matched by the ordinary high frequency circuit without extreme expense and inefficiency for the power circuit must be designed to have both a high voltage for initiation of the strike-in and a high maximum current output to complete the melting of the stripe. Thus, although neither of these requirements is imposed on the apparatus throughout the entire process, the necessity for meeting both requirements in the successful performance of the process requires, in conventional power sources, an excessive power rating many times what it is ever called upon to deliver.

It has been found much more satisfactory to provide one or more additional power sources, usually of different potential and/or frequency connected either in series or in parallel with the initial high frequency source, and specifically designed to match the impedance of the load at different times during its temperature rise. Thus each power source can be efficiently designed to perform a particular part of the heating operation, each adding its increment of energy to the glass when glass conditions reach the point where the power source can become effective. In the circuit shown in Fig. 2, a second power source, indicated as being of low frequency and low voltage, is connected to the electrodes 16 thru inductances $L_1$ and $L_2$, which act as choke coils preventing flow from the high frequency source into the low frequency system. A bridging condenser $C_3$ is provided thru which may flow any high frequency current leaking thru the choke coils. In the particular circuit illustrated the inductances may be of the order of 8 millihenrys while condenser $C_3$ should be of the order of .1 microfarad. In a typical application of this circuit to electric glass working operations, the high frequency source may be able to deliver a maximum of 1 kilowatt to the electrodes (i. e., 100 milliamperes at 10 k. v.). The resistance of a representative glass tube stripe may be lowered to 10,000 ohms by external preheat and the passage of high frequency current thru the path. Thus the entire power output of the high frequency source may be dissipated in the stripe at a relatively early stage of the heating operation. At the final stage of the heating operation when the glass has reached melting temperature, the resistance will have dropped to a value of the order of 200 ohms. To achieve this result current densities as high as 5 amperes may be required. These may easily be obtained from a conventional 5 k. w. 60 cycle transformer giving 5 amperes at 1,000 volts. This voltage, which is but a tenth of that required for initial strike-in, is sufficient to continue the heating effect initiated by the high frequency source when the maximum output of that source has been reached, picking up the load and carrying it thru to completion of the process. The high frequency source continues to supply a portion of the heating current but at the end of the process this has dropped to about 20 watts.

Figure 5:
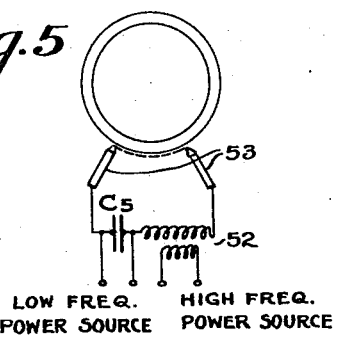
Fig. 5 is a diagram showing a series connected two frequency power supply similar to that shown in Fig. 2.

An alternative series arrangement of the two frequency power source shown in Fig. 2 is diagrammatically illustrated in Fig. 5. This circuit has certain advantages in that it permits the elimination of the high frequency chokes $L_1$ and $L_2$. This circuit includes an air core transformer 52 connected in series with a condenser $C_5$ across electrodes 53. A high frequency power source designed to give approximately 1 kilowatt at a frequency of 1 megacycle is connected to the low tension winding of transformer 52 while a 60 cycle power source designed to give approximately 5 kilowatts at 1,000 volts is connected across condenser $C_5$. This condenser may be of the order of one-tenth microfarad capacity.

Figure 3:
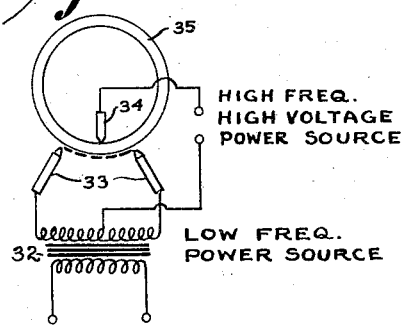
Fig. 3 is a diagram showing another form of two frequency power supply incorporating control features for the discharge.

While the simple application of sufficient voltage to electrodes 16 will produce a spark between them, the passage of this spark across the glass heats not only the glass but the surrounding air as well and tends to cause the spark to blow out away from the glass, thus materially lessening its effectiveness and increasing the period of time before it strikes into the glass and conduction heating begins. To overcome this tendency it has been found desirable to impress a higher voltage on an electrode positioned between the spark electrodes and on the opposite side of the glass. Where the configuration of the glass parts being worked on permits, it is desirable to position the high voltage pilot electrode immediately opposite the arc and separated therefrom merely by the glass being heated. Such an arrangement is shown diagrammatically in Fig. 3. In this circuit the high tension secondary of the transformer 32 is connected to spark electrodes 33 while its primary is connected to a high capacity power source. A separate high voltage circuit is tapped into the midpoint of the transformer and connected to the pilot electrode 34 positioned inside the tube 35 between the electrodes. This potential tends to draw the arc against the surface of the tube and, after it has struck into the glass itself, causes a secondary heating current to flow thru the glass.

It has been found that when the glass becomes warm either from the heating effect of the spark or some diffuse source of heat such as band 26, the initial discharge thru the glass occurs between electrode 34 and one of the electrodes 33. This effect may be ensured by placing electrode 34 more nearly in alignment with one of the outside electrodes. By using a low powered high frequency source, pyroelectrolytic breakdown of the glass passing between these electrodes is encouraged and a very accurately located straight hot stripe is developed in the wall of the tube 35 which is raised to a point where the main discharge between the electrodes 33 can strike in and melt the glass. If the power source employed for the high frequency trans-glass current is too high local irregularities in the temperature of the stripe are accentuated and it is very easy to actually burn a series of holes thru the wall of the tube before the entire band is raised to a temperature at which the discharge between electrodes 33 will strike in. It is this peripheral discharge between electrodes 33 which counteracts local irregularities of temperature and produces uniform glass working conditions or burnoff. The farther apart the electrodes 33 can be placed conveniently the more uniform the stripe produced.

Figure 4:
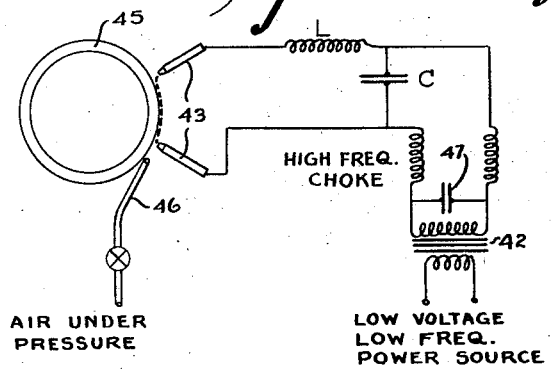
Fig. 4 is a diagram showing another form of two frequency supply system.

Various circuits have been described above in which high frequency potentials have been utilized in heating glass articles alone or in combination with lower frequency potentials. While numerous devices are available to supply high frequency potentials, all of these are notoriously inefficient, heat losses often accounting for as much as 50% or more of the input power. In spark oscillators the major part of this energy loss occurs in the spark itself. In order to raise the operating efficiency of the present glass working device a supply circuit has been devised in which the spark from the electrodes to the glass is used to energize the circuit which supplies the major portion of the heating current. This circuit is shown in detail in Fig. 4. In this circuit, power is drawn from a typical commercial source such as 60 cycle current at 440 volts. As shown, the line voltage is stepped up to a much higher value, conveniently 20,000 volts, in a transformer 42 of relatively low capacity; that is, from 5–20 k. v. a. When the secondary of the transformer is connected to the glass working electrodes 43 spaced from ½" to 1" apart, a spark will be drawn between the electrodes along the surface of the glass body 45. Such a spark will heat the glass surface sufficiently to render it conducting at 20,000 volts but since the capacity of the transformer is limited the current which will flow is insufficient to raise the glass to melting temperature. For this reason inductance L is inserted in the circuit and connected in series with the electrodes by capacity C. So arranged the inductance, capacity, and electrodes form a resonant circuit thru the spark. To prevent this spark from constituting a permanent short circuit conductor across capacity C an air blast is directed against at least one of the electrodes from a suitable source 46. This blast of air functions to interrupt the spark discharge and permit charging of the capacity C by the transformer voltage. As the spark reforms an oscillatory discharge occurs across the electrodes thru the L and C circuit. By making L of a sufficiently low value this oscillatory surge may have a peak current value many times that which can be drawn from the transformer. The frequency of this discharge can be varied at will by proper choice of values for L and C, but may desirably be on the order of .5 to 10 megacycles. Thus the oscillatory discharge not only provides high amperage surges having high heating ability but provides them at a frequency which will promote strike-in to the body of the glass. Radio frequency chokes may be positioned in the lines leading to the power transformer secondary to prevent destructive high frequency surges thru this equipment which may be further protected by bridging condenser 47. In place of the air blast, quenching of the spark may be conveniently effected by means of a properly positioned and synchronized electromagnetic field.

Altho the present invention has been described in connection with certain specific apparatus and circuits, it is to be understood that these are disclosed by way of illustration and various equivalent structures may be substituted in commercial practice. For example, alternators and generators of the proper frequency and capacity may be directly connected to the various electrodes and burners in place of the transformers illustrated in the circuit diagrams. Accordingly it is to be understood that the invention is to be limited only by the scope of the appended claims.

The term "hard glass" as used in the appended claims refers to the viscous condition of the glass rather than to its chemical composition.

What is claimed is:

1. The method of heating a restricted area of a glass body, which comprises creating a spark discharge between spaced points along the surface of the body and forcing said spark against said glass surface by creating a potential difference between said spark and a point on the opposite side of said glass body in alignment with said spark.

2. The method of heating a restricted path in a hard glass body, which comprises passing a non-disruptive high frequency discharge thru the thickness of the glass, moving said glass and discharge with respect to one another to heat a stripe in said glass, and passing a second discharge longitudinally of said stripe to heat the entire stripe to softness.

3. The method of heating a restricted path in a hard glass body which comprises passing a non-disruptive high frequency discharge between pointed electrodes aligned on opposite sides of the glass body establishing relative movement of said body and electrodes to cause said discharge to pass repeatedly thru adjacent sections of a closed path in said body and causing another electric discharge to flow thru said path longitudinally thereof while continuing the relative movement of said glass with respect to said electrodes.

4. The method of heating a restricted path in a hard glass body which comprises passing an electric current thru the glass along said path between spaced electrodes located on one side thereof and passing another current of high frequency thru the glass along said path between electrodes on opposite sides of said body and simultaneously moving said body with respect to said electrodes.

5. In a device for working hard glass, means for holding a glass body, a pair of electrodes terminating adjacent the surface of said body, means for effecting an electrical discharge between said electrodes, a third electrode positioned on the opposite side of said glass body between said first mentioned electrodes, and means for establishing a potential difference between said third electrode and each of said other electrodes.

6. In a device for working hard glass, means for holding a glass body, a pair of electrodes terminating adjacent the surface of said body, means for effecting a spark discharge between said electrodes, said means comprising a transformer having a high tension secondary winding connected to said electrodes, said secondary winding having a tap at its mid point, a third electrode positioned between said other electrodes and spaced therefrom by the glass surface subjected to the spark discharge, and means connecting said tap and said third electrode to a high potential source.

EDWIN M. GUYER.

REFERENCES CITED

The following references are of record in the file of this patent:

UNITED STATES PATENTS

| Number | Name | Date |
| --- | --- | --- |
| 512,604 | Coffin | Jan. 9, 1894 |
| 1,107,387 | Voelker | Aug. 18, 1914 |
| 1,570,803 | Walker | Jan. 26, 1926 |
| 1,587,197 | Southgate | June 1, 1926 |
| 1,722,010 | Littleton, Jr., et al. | July 23, 1929 |
| 1,954,678 | Meissner | Apr. 10, 1934 |
| 2,018,056 | Delpech | Oct. 22, 1935 |
| 2,205,425 | Leonard | June 25, 1940 |

FOREIGN PATENTS

| Number | Country | Date |
| --- | --- | --- |
| 86,368 | Austria | June 15, 1921 |
| 516,783 | Germany | May 2, 1928 |